United States Patent
McKay et al.

(10) Patent No.: US 9,057,343 B2
(45) Date of Patent: Jun. 16, 2015

(54) CONTROL SYSTEM

(75) Inventors: Richard John McKay, Brewood (GB);
Gareth Edward Morris, Tring (GB);
Paul Hardy, Wolverhampton (GB);
Marc Holme, Kenilworth (GB); Nichola Ann Sanderson, San Diego, CA (US);
Colin Roy Terrey, Bonita, CA (US)

(73) Assignees: GOODRICH ACTUATION SYSTEMS LIMITED (GB); ROHR, INC., Chula Vista, CA (US)

( * ) Notice: Subject to any disclaimer, the term of this patent is extended or adjusted under 35 U.S.C. 154(b) by 1140 days.

(21) Appl. No.: 13/024,710

(22) Filed: Feb. 10, 2011

(65) Prior Publication Data

US 2011/0192135 A1 Aug. 11, 2011

(30) Foreign Application Priority Data

Feb. 11, 2010 (GB) .................................. 1002315.8

(51) Int. Cl.
*F02K 1/76* (2006.01)

(52) U.S. Cl.
CPC ...................................... *F02K 1/763* (2013.01)

(58) Field of Classification Search
CPC ............. F02K 1/763; F02K 1/16; F02K 1/72; F02K 1/76; F05D 2270/62
USPC ...................... 60/770, 771, 773, 226.2, 226.3; 239/265.11–265.43
See application file for complete search history.

(56) References Cited

U.S. PATENT DOCUMENTS

| | | | |
|---|---|---|---|
| 3,096,617 A | 7/1963 | Bryant | |
| 4,383,647 A | 5/1983 | Woodruff et al. | |
| 4,505,108 A | 3/1985 | Woodruff et al. | |
| 6,526,744 B2 * | 3/2003 | Ahrendt | 60/204 |
| 6,684,623 B2 * | 2/2004 | Langston et al. | 60/226.2 |
| 7,127,880 B2 * | 10/2006 | Lair et al. | 60/204 |
| 7,370,468 B2 * | 5/2008 | Colotte et al. | 60/226.2 |
| 2005/0086927 A1 | 4/2005 | Lair et al. | |
| 2008/0110153 A1 | 5/2008 | Seda et al. | |
| 2010/0313546 A1 | 12/2010 | Kubiak | |

FOREIGN PATENT DOCUMENTS

| | | | |
|---|---|---|---|
| EP | 1 978 231 | 10/2008 | |
| EP | 1978231 | 10/2008 | |
| EP | 2 050 948 | 4/2009 | |
| FR | 0800772 | * 8/2009 | ............. B64D 29/00 |
| GB | 2446441 | 8/2008 | |
| WO | 2008045056 | 4/2008 | |
| WO | 2009101274 | 8/2009 | |
| WO | WO2009/101274 | 8/2009 | |

OTHER PUBLICATIONS

GB Search Report dated Jun. 11, 2010.
European Search Report dated Sep. 13, 2012.

* cited by examiner

*Primary Examiner* — Phutthiwat Wongwian
*Assistant Examiner* — Steven Sutherland
(74) *Attorney, Agent, or Firm* — Cantor Colburn LLP

(57) ABSTRACT

A control system comprises a TRAS actuator 14, a VAFN actuator 40, and a control arrangement 52 operable to control the operation of the TRAS actuator 14 and the VAFN actuator 40, wherein at least one control circuit 54 of the control arrangement 52 is a common control circuit, common to the operation of both the TRAS actuator 14 and the VAFN actuator 40.

6 Claims, 5 Drawing Sheets

CONTROL SYSTEM

This invention relates to a control system, and in particular to an actuator control system for use in controlling the operation of actuators associated with an aircraft thrust reverser actuation system (TRAS) and actuators associated with an aircraft variable area fan nozzle (VAFN) system.

The provision of TRAS systems associated with the engines of an aircraft is well known. Such systems make use of actuators operable to drive associated cowls for movement between stowed and deployed positions. Typically, two or more such cowls are associated with each engine, and two or more actuators are associated with each cowl. When moved from their stowed positions to their deployed positions the cowls re-direct the engine exhaust airflow so as to provide a reverse thrust. Such deployment is used to slow the aircraft when the aircraft is on the ground, primarily immediately after landing but there may be other circumstances in which it may be used whilst the aircraft is on the ground.

Some aircraft are also provided with a VAFN system operable to alter the profile of the engine outlet to change the aerodynamic performance of the engine. This may be undertaken in order to reduce noise during take-off or to enhance fuel efficiency during flight. Where a VAFN system is present then it typically comprises movable cowls and associated actuators to drive the cowls for movement. Where both a TRAS system and a VAFN system are provided, then sometimes the actuators of the VAFN system are mounted upon the cowls of the TRAS system, for example by means of a telescopic drive arrangement as described in EP 1978231. However, this is not always the case and arrangements are known in which the VAFN actuators are mounted upon a fixed part, for example the torque box, of the engine housing.

The actuators of the TRAS system and those of the VAFN system are typically controlled independently using separate control units, motors and power drive electronics. The motors and associated power drive electronics are relatively bulky and heavy, complex and expensive. For example, US2005/0086927 describes an arrangement in which separate actuators and motors are provided to operate the VAFN and TRAS systems.

It is an object of the invention to provide a control system for use in such applications in which at least some of the disadvantages associated with known systems are overcome or are of reduced effect.

According to the present invention there is provided a control system comprising a TRAS actuator, a VAFN actuator, and a control arrangement selectively operable to control the operation of the TRAS actuator and the VAFN actuator, wherein the TRAS actuator and the VAFN actuator are electric motor driven, and at least one control circuit of the control arrangement is a common power drive control circuit, common to the operation of both the TRAS actuator and the VAFN actuator.

It will be appreciated that by using the same circuit to provide functionality for both the TRAS actuator and the VAFN actuator, some savings can be made by avoiding unnecessary duplication. The weight savings and space savings that can be made where the common control circuit includes the power drive circuit are significant.

As the TRAS system is typically only used for short periods of time during landing, and is only used whilst the aircraft is on the ground, and the VAFN system is used during take-off and throughout in-flight operations, simultaneous operation of both systems is not required and so the provision of a common control circuit that may be incompatible with such simultaneous operation does not, in practise, impose a limitation on functionality.

The TRAS actuator may be driven by a TRAS motor, and the VAFN actuator by a VAFN motor, a contactor or other switch means being operable to determine which of the motors is controlled by the common control circuit at any given time. Where the common control circuit comprises a power drive circuit, then the contactor or switch means controls which of the motors receives electrical drive.

The contactor or other switch means is conveniently arranged to have a default or unpowered position or operating mode in which the TRAS motor is isolated. Such an arrangement provides an additional line of defence against inadvertent TRAS deployment.

Two or more TRAS actuators may be provided, and may be driven by a single motor. Alternatively, separate motors may be provided for each TRAS actuator. Likewise, two or more VAFN actuators may be provided and driven by a single motor, or separate motors may be provided for each VAFN actuator. The or each VAFN actuator may be mounted upon an associated thrust reverser cowl, and arranged to receive drive from a fixed motor via a telescopic drive coupling.

Alternatively, a single motor may be arranged to provide drive to the TRAS actuator and to the VAFN actuator. In such an arrangement, locks are conveniently provided to control which of the actuators is driven at any given time. A differential drive arrangement may be provided to transmit drive from the motor to the actuators. The locks are conveniently arranged such that only one of the locks can be disengaged at any given time.

The motor or motors used to drive the actuators will conveniently be electric motors. However, arrangements are also possible in which one or more of the actuators is hydraulically operated in which case the control circuit may operate to control the operation of control valves associated with the actuator.

The invention will further be described, by way of example, with reference to the accompanying drawings, in which.

Figure 1:
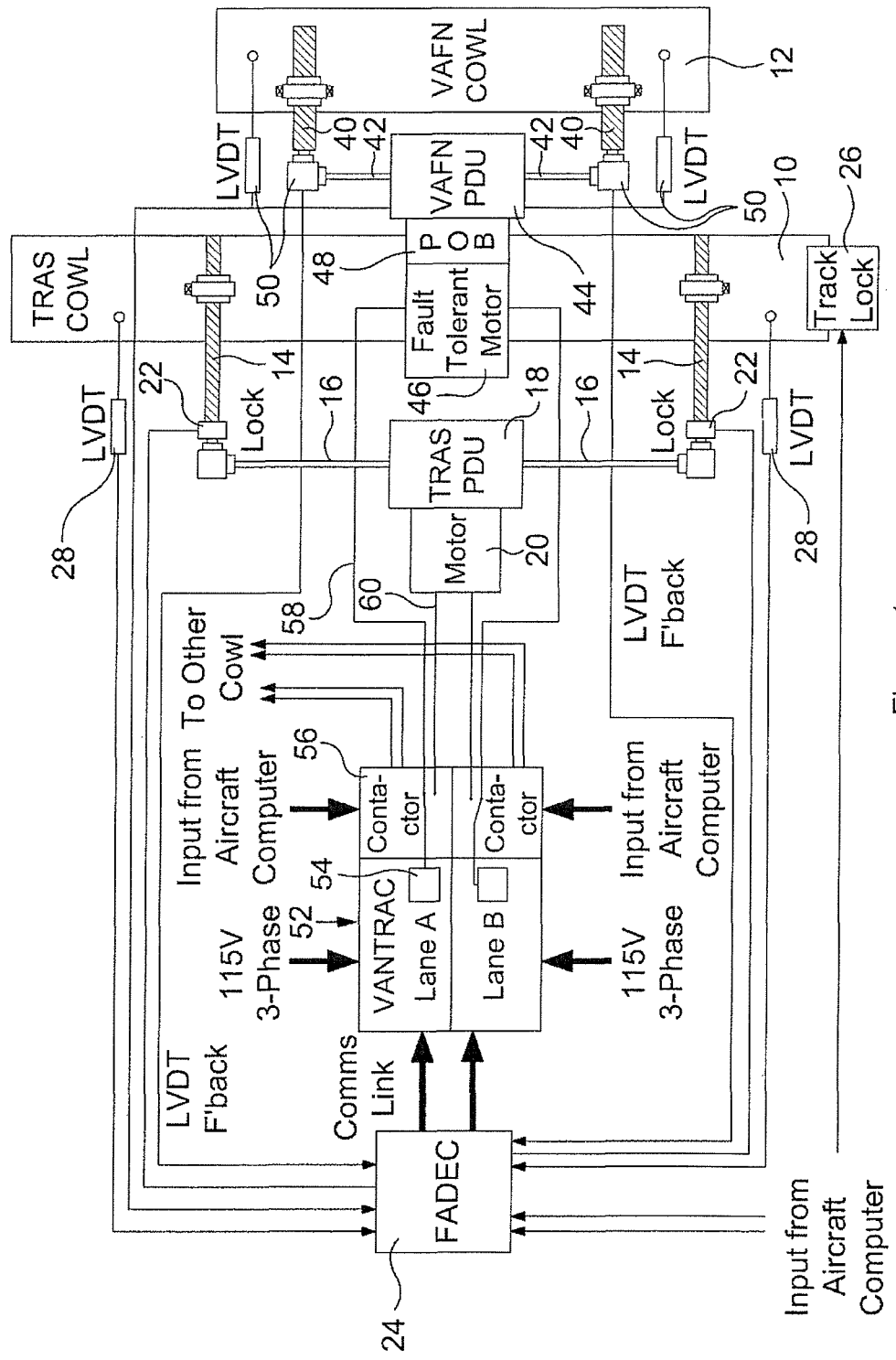
FIG. 1 is a diagrammatic view illustrating a control system in accordance with one embodiment of the invention.

The control system illustrated in FIG. 1 is intended for use in controlling the positions occupied by and movement of a thrust reverser cowl 10 and a VAFN cowl 12. The cowls 10, 12 are associated with an engine (not shown) of an aircraft, and in practise each engine of the aircraft may have, for example, a pair of semi-circular 'split sleeve-type' thrust reverser cowls 10, only one of which is shown in FIG. 1, and similarly will include a plurality of the VAFN cowls 12. It will be appreciated that the nature of the cowls 10, 12 is not of relevance to the invention, and that they may take other forms.

The thrust reverser cowl 10 is arranged to be driven for movement between stowed and deployed positions by a pair of thrust reverser (TRAS) actuators 14. The TRAS actuators 14 are of the screw-jack type, each including a rotatable shaft anchored to a fixed part of the engine housing such that the shaft is capable of rotation but unable to move axially. The shaft is provided with screw-thread formations with which a nut component co-operates via a ball-screw coupling, the nut component being secured to the cowl 10 such that rotation of the shaft causes displacement of the nut and the cowl 10. The actuators 14 are connected via respective drive shafts 16 to a power drive unit 18 arranged to be driven for rotation by an associated electric motor 20. The drive shafts 16 are conveniently of flexible form, although this need not always be the case.

As illustrated, each actuator 14 includes a lock 22 operable under the control of an engine controller 24. Likewise, a track lock 26 is provided to lock the cowl 10 against movement, the track lock 26 being controllable by the associated aircraft computer. Position sensors 28 monitor the position of the cowl 10 and provide appropriate feedback information to the controller 24.

The VAFN cowl 12 is arranged to be driven by a pair of VAFN actuators 40 of form similar to the TRAS actuators 14. The actuators 40 are connected by drive shafts 42 to a power drive unit 44 arranged to be driven by a fault tolerant electric motor 46. The nature of the fault tolerant motor is not of relevance to the present invention and will not be described in further detail. A power off brake 48 is provided to prevent the application of drive to the actuators 40 other than when desired. Although in FIG. 1 the location of the fault tolerant motor 46 appears to be such that it is mounted upon the thrust reverser cowl 10, this is not in fact the case, and it is mounted upon a part of the engine housing. The drive shafts 42 are conveniently of flexible form.

Sensors 50 sense the position of the VAFN cowl 12 and status of the actuators 40 and provide position and status information back to the controller 24.

In accordance with the invention the motors 20, 46 are controlled by a control unit 52 including at least one control circuit common to the control of both the motor 20 for use in controlling the position and movement of the thrust reverser cowl 10 and the motor 46 for use in controlling the position and movement of the VAFN cowl 12. The common circuit, in the arrangement illustrated, takes the form of a power drive circuit 54. A contactor or switch arrangement 56 controls which of the motors 20, 46 receives power from the circuit 54 via power supply lines 58, 60. The contactor or switch arrangement 56 is controlled by an aircraft computer.

In order to provide the required level of redundancy, the control unit 52 is conveniently of dual channel type, and each of the motors 20, 46 includes a pair of channels connected to respective channels of the control unit 52 such that appropriate control over the operation of the thrust reverser cowl 10 and VAFN cowl 12 can be maintained in the event of a failure. Further, as illustrated in FIG. 1, the control unit 52 may be operable to control the positions and movement of others of the thrust reverser cowls and VAFN cowls 10, 12 associated with the engine, thus only a single control unit 52 may be required to control the positions and movement of all of the thrust reverser cowls 10 and VAFN cowls 12 associated with the engine.

In use, in the position shown, the contactor or switch arrangement 56 connects the output of the circuit 54 to the line 58 connected to the motor 46 associated with the VAFN cowl 12. In this position, if it is desired to adjust the position of the VAFN cowl 12, then the control unit 52 will control the operation of the circuit 54 to output an appropriate power supply or signal to drive the motor 46 such that the cowl 12 is moved to the desired position. The outputs of the sensors 50 are used by the controller 24 to determine when the desired position has been attained whereupon the controller 24 instructs the control unit 52 to terminate the power supply to the motor 46. Such control can thus take place in a closed loop fashion. If it is desired to deploy the thrust reverser cowl 10, then the contactor or switch arrangement 56 is switched to its alternative position. Switching of the contactor or switch arrangement 56 in this manner prevents the output of the common circuit 54 being supplied to the motor 46 associated with the VAFN cowl 12, and the power-off brake 48 will ensure that the VAFN cowl 12 is held against movement. Instead, the output of the common circuit 54 is applied to the motor 20 associated with the thrust reverser cowl 10 and by appropriate operation of the control unit 52, the thrust reverser cowl 10 can be driven to its deployed position. As usual with thrust reverser systems before the thrust reverser cowl 10 can be driven to its deployed position the track lock 26 and locks 22 associated with the actuators 14 must be disengaged, and the operation of the actuators 14 will only be undertaken once the locks have been disengaged.

Movement of the thrust reverser cowl 10, like that of the VAFN cowl 12, is monitored by the associated position sensors 28, the outputs of which can be used to achieve closed-loop control over the cowl 10.

When neither cowl is to be moved then the system may be unpowered and all of the locks, together with the power off brake, are engaged to hold the cowls against movement.

The contactor or switch arrangement 56 may take a range of forms. For example, it may comprise a controllable mechanical switch device. Alternatively, it may comprise a solid state relay serving as a contactor or switch. As the drive motors 20, 46 represent large inductive loads, care must be taken to ensure that arcing at the contactor or switch arrangement 56 during the switching process is avoided. This may be achieved, for example, by ensuring that drive power to the motors 20, 46 is terminated ahead of the time at which switching is undertaken. Where a solid state relay is used, then this is less of a problem.

It is envisaged that the default or unpowered position of the contactor or switch arrangement 56 will be to connect the output of the circuit 54 to the motor 46 associated with the VAFN cowl 12. By making this the default condition, the risk of the motor 20 associated with the thrust reverser cowl 10 receiving power other than when required is minimised and this provides an additional line of defence against the possibility of inadvertent thrust reverser deployment.

Figure 2:
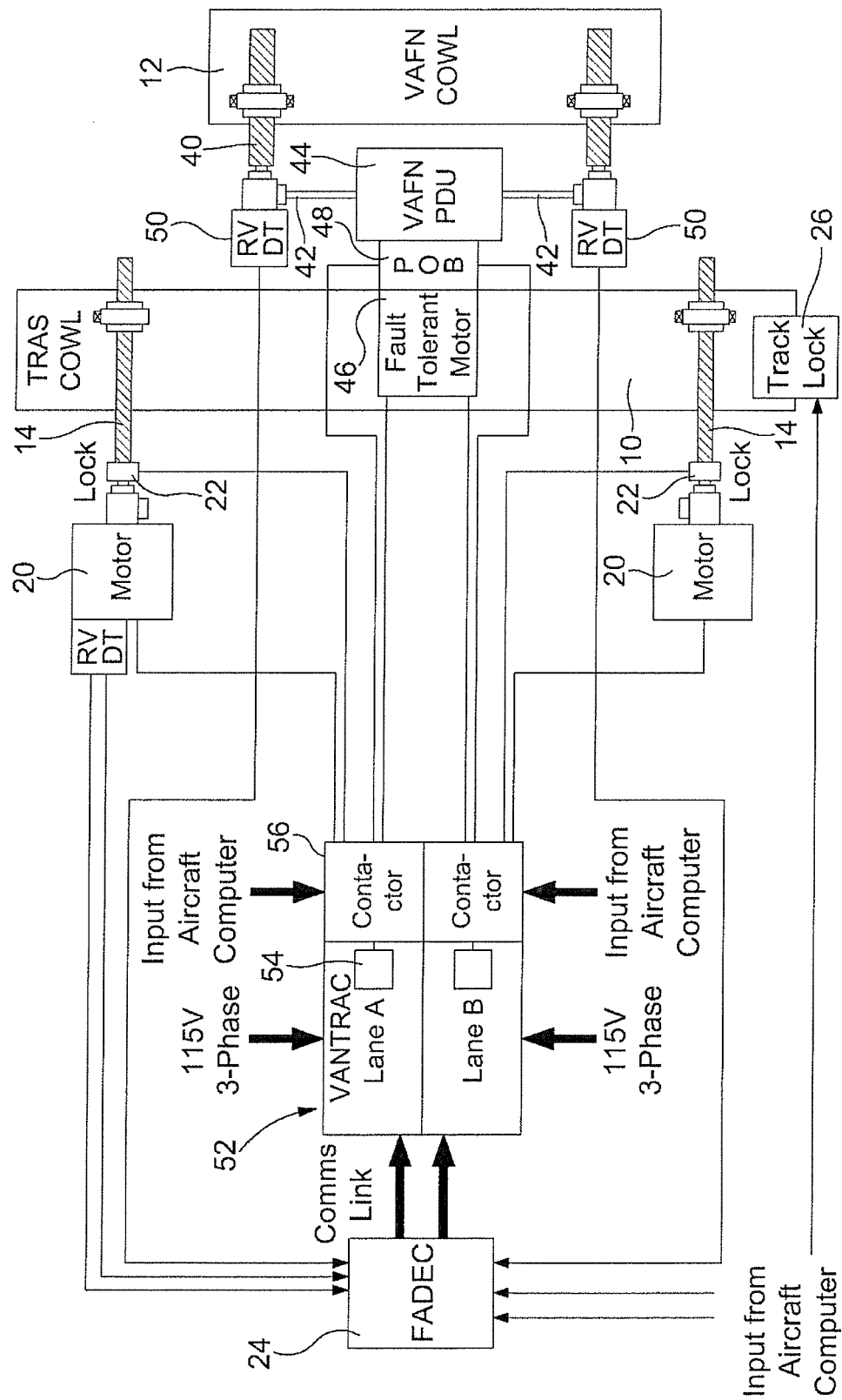
FIGS. 2 to 4 illustrate some variants of the arrangement of FIG. 1.

It will be appreciated that a range of modifications and alterations may be made to the arrangement of FIG. 1. For example, FIG. 2 illustrates an arrangement in which rather than provide a single motor 20 associated with the thrust reverser cowl 10, each actuator 14 is provided with its own electric motor 20 powered from respective channels of the control unit 52, and as a result there is no need to provide a power drive unit or associated drive shafts to couple the motor output to the actuators 14. Operation of the arrangement of FIG. 2 is substantially identical to that of FIG. 1 and will not be described in further detail.

Figure 3:
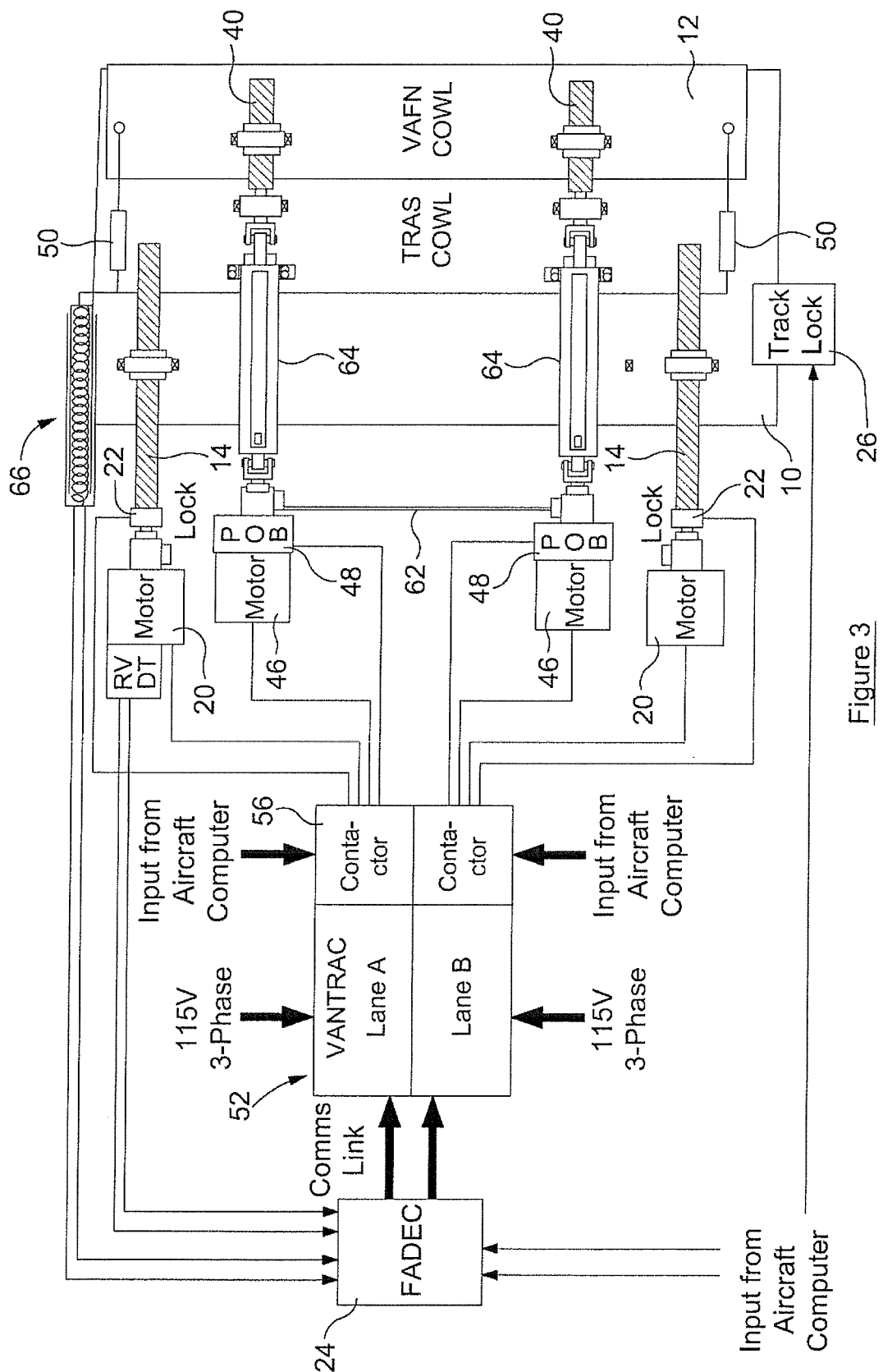

FIG. 3 illustrates an arrangement similar to that of FIG. 2 but in which, in addition to providing separate motors 20 associated with each actuator 14, separate motors 46 are provided for each actuator 40. Consequently, the power drive unit 44 can be omitted. As in the arrangements of FIGS. 1 and 2 a power-off brake 48 is associated with each motor 46 to prevent operation of the associated actuator 40 when this is not required.

In the arrangements of FIGS. 1 and 2, the motor 46 associated with the VAFN cowl 12 is a fault tolerant motor having multiple separate windings to enable continued operation in the event of a winding failure. In the arrangement of FIG. 3 this is not the case. In order to ensure that the VAFN system can continue in the event of the failure of one of the motors 46 or associated control unit, a flexible shaft 62 is connected between the outputs of the motors 46 to ensure that both actuators 40 can continue to operate even if one of the motors 46 has failed.

In the arrangements of FIGS. 1 and 2 the cowls 10 are of the split-sleeve type, the actuators 40 associated with the VAFN cowl 12 being mounted to a fixed part of the engine housing. In the arrangement of FIG. 3, the cowls 10 are of the type in which the actuators 40 are mounted upon the thrust reverser cowls 10. The motors 46 are fixed to the engine housing and the outputs thereof are transmitted to the associated actuators 40 via telescopic drive transmission means 64. Although telescopic means 64 are illustrated, it will be appreciated that other forms of extending mechanical coupling could be used to transmit the output of the motors 46 to the associated actuators 40.

The sensors 50 are mounted upon the thrust reverser cowl 10 and are movable therewith. An extendable transmission device 66 is provided to allow the transmission of the output signals from the sensors 50 to the control unit 24 regardless of the position of the cowl 10. The device 66 may be as simple as a length of coiled cable which can extend upon movement of the thrust reverser cowl 10 towards its deployed position.

Figure 4:
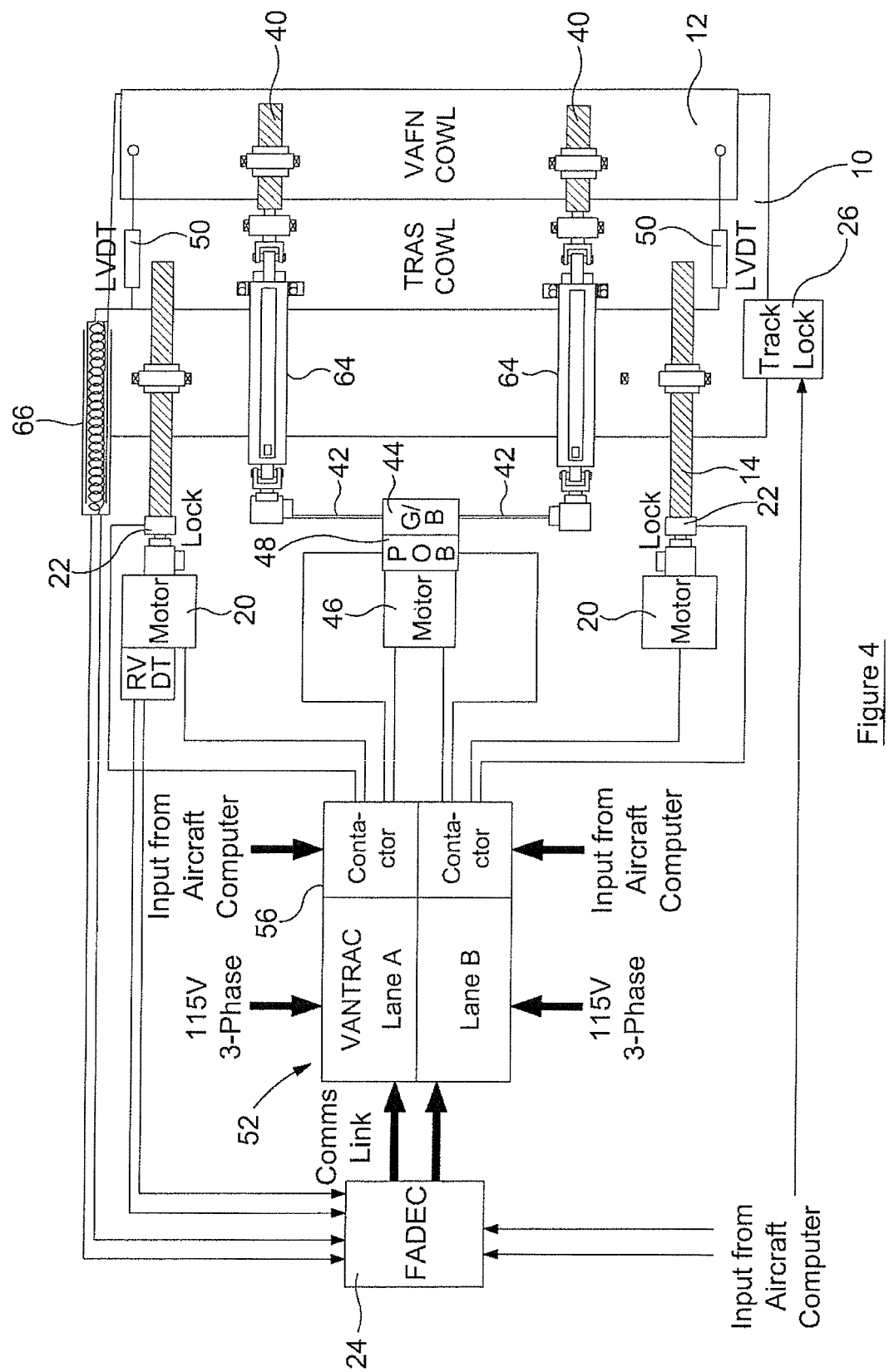

FIG. 4 illustrates an arrangement that is very similar to FIG. 3 but in which a single motor 46 is provided for use in driving the actuators 40 for movement, as shown in FIGS. 1 and 2 but including telescopic drive transmission means 64.

Figure 5:
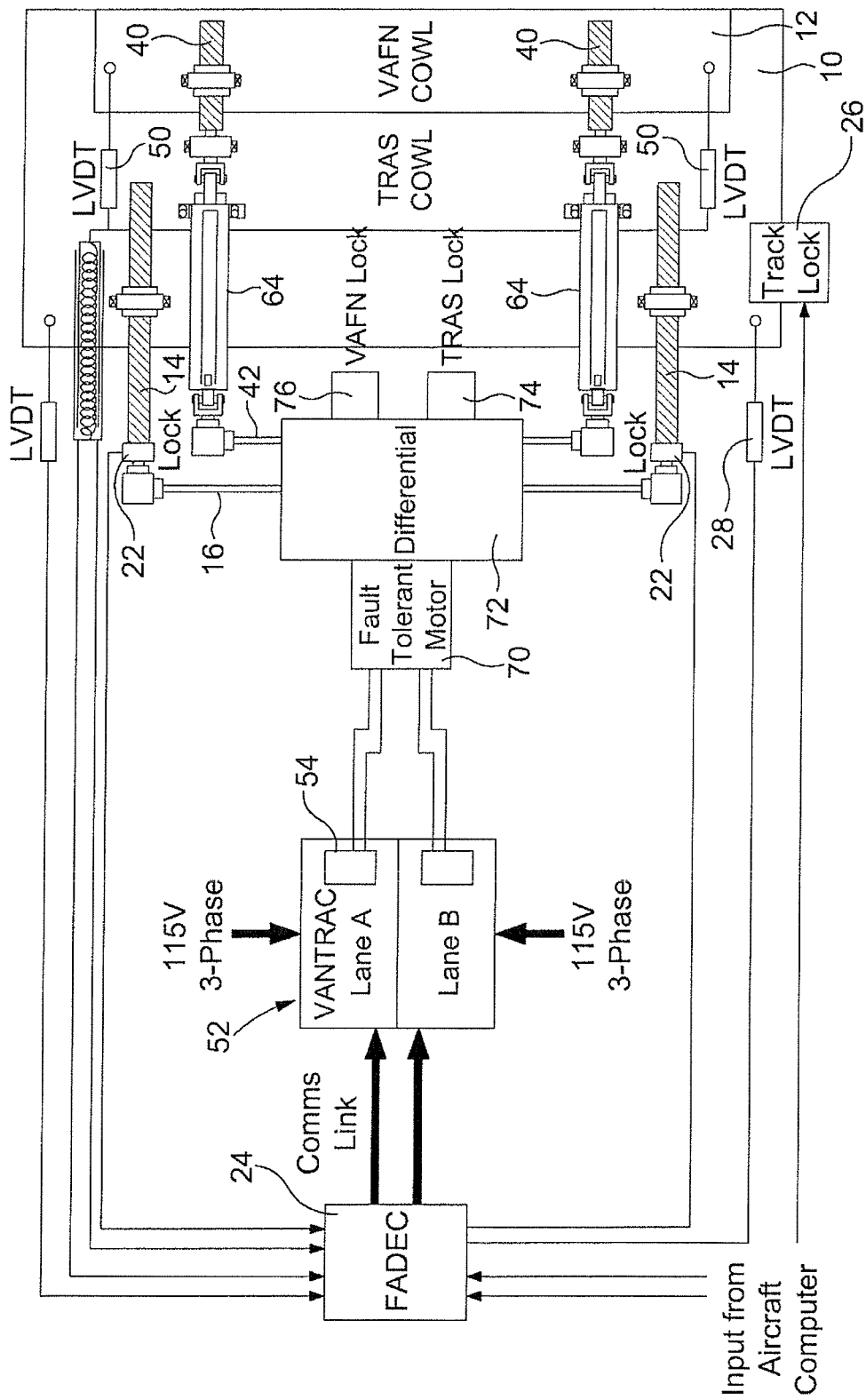
FIG. 5 illustrates another embodiment of the invention.

FIG. 5 illustrates an alternative embodiment in which a single fault tolerant motor 70 is controlled by the output of the control unit 52. The motor 70 drives a differential gear arrangement 72 having a first output connected via drive shafts 16 to the actuators 14 used to drive the thrust reverser cowl 10 and a second output connected via drive shafts 42 to the actuators 40 used to drive the VAFN cowl 12.

The differential drive arrangement 72 includes lock means operable to permit the outputs thereof to be locked against rotation. The operation of the lock means is conveniently controlled by the aircraft computer. The lock means may be of electrically or electromagnetically controllable form. The arrangement 72 thus includes a thrust reverser lock 74 operable to lock the first output and drive shafts 16 against rotation and a VAFN lock 76 operable to lock the second output and drive shafts 42 against rotation. Conveniently, an interlock device (not shown) is provided which ensures that when one of the locks 74, 76 is disengaged, the other of the locks 74, 76 is engaged, thereby ensuring that drive cannot be applied to both the thrust reverser actuators 14 and the VAFN actuators 40 simultaneously. The interlock device may be arranged to permit both locks to be engaged simultaneously. Conveniently at least the TRAS lock may be a power off lock such that in the absence of an unlock signal being provided to the TRAS lock movement of the cowl 10 will be prevented. This provides an additional line of defence against the possibility of inadvertent thrust reverser deployment.

In use, when the VAFN cowl 12 is to be moved, the VAFN lock 76 is released and the thrust reverser lock 74 is engaged. The motor 70 is then driven under the control of the control unit 52, using the common power drive circuit 54 to apply electrical power to the motor 70. As the thrust reverser lock 74 is engaged, the operation of the motor 70 results only in rotation of the second output of the differential drive arrangement 72 which is transmitted to the actuators 40 via, in this case, the drive shafts 42 and telescopic drive means 64, to drive the VAFN cowl 12 for movement.

Movement of the thrust reverser cowl 10 is achieved by engaging the VAFN lock 76 and disengaging the thrust reverser lock 74 prior to operation of the motor 70. As usual the track lock 26 and other locks 22 must also be released before the cowl 10 can be moved and this is undertaken prior to energisation of the motor 70.

The differential drive arrangement 72 may comprise, for example, an epicyclic gear arrangement, but it will be appreciated that other forms of differential drive arrangement could be used.

Although FIG. 5 illustrates a thrust reverser arrangement in which the VAFN cowls are mounted to the thrust reverser cowls, it will be appreciated that it may be modified for use with a split-sleeve type arrangement if desired.

It will be appreciated that, in all of the arrangements described hereinbefore, savings can be made in terms of complexity, cost, weight and space by avoiding unnecessary duplication of circuits of the control unit 52, providing at least one circuit that is common to the operation of both the actuators associated with the VAFN cowl and the actuators associated with the thrust reverser cowl. Where the common circuit takes the form of a power drive circuit for use in applying electrical power to a motor, the savings can be significant. Where duplication of motors can be avoided, then additional savings may be made.

Although in the description hereinbefore the actuators 14, 40 are electrically driven, the invention may also be applied to hydraulically driven arrangements, for example arrangements with hydraulically driven thrust reverser actuators. In such arrangements, the output of the common circuit 54 may be used to control, for example, solenoid controlled valves to control the operation of the actuators.

In the arrangements described hereinbefore each cowl has two actuators associated therewith. It will be appreciated that this need not always be the case and that arrangements having three or more actuators associated with one or more of the cowls are possible. Further, although mention is made of specific sensors, the numbers, types and positions of the sensors need not be as shown.

It will be appreciated that a wide range of modifications may be made to the arrangements described hereinbefore without departing from the scope of the invention.

The invention claimed is:

1. A control system comprising a TRAS actuator, a VAFN actuator, and a control unit selectively operable to control the operation of the TRAS actuator and the VAFN actuator, wherein the TRAS actuator is driven by a TRAS electric motor, and the VAFN actuator by a VAFN electric motor, and at least one control circuit of the control unit is a common power drive control circuit, common to the operation of both the TRAS actuator and the VAFN actuator; wherein:
   the control unit is of a dual channel type, and each of the TRAS electric motor and the VAFN electric motor includes a pair of power supply channels connected to respective channels of the control unit; and
   a contactor or other switch means receives power from the control circuit via said power supply channels and is operable to determine which of the motors is controlled by the common power drive control circuit at any given time.

2. A system as claimed in claim 1, wherein the contactor or other switch means has a rest or default position in which the TRAS motor is isolated so as to provide protection against inadvertent operation.

3. A system as claimed in claim 1, wherein the TRAS actuator comprises two or more TRAS actuators driven by the TRAS electric motor.

4. A system as claimed in claim 1, wherein the TRAS actuator comprises two or more TRAS actuators; the TRAS electric motor comprises two or more TRAS electric motors; and each TRAS actuator is driven by a different one of the two or more TRAS electric motors.

5. A system as claimed in claim 1, wherein the VAFN actuator comprises two or more VAFN actuators driven by the VAFN electric motor.

6. A system as claimed in claim 1, wherein the VAFN actuator comprises two or more VAFN actuators; the VAFN electric motor comprises two or more VAFN electric motors; and each VAFN actuator is driven by a different one of the two or more VAFN electric motors.

* * * * *